US006963808B1

(12) United States Patent
Addink et al.

(10) Patent No.: US 6,963,808 B1
(45) Date of Patent: Nov. 8, 2005

(54) METHODS AND APPARATUS FOR USING WATER USE SIGNATURES IN IMPROVING WATER USE EFFICIENCY

(75) Inventors: John W. Addink, Riverside, CA (US); Sylvan Addink, Riverside, CA (US); Tony Givargis, Anaheim, CA (US)

(73) Assignee: Aqua Conserve, Inc., Riverside, CA (US)

(*) Notice: Subject to any disclaimer, the term of this patent is extended or adjusted under 35 U.S.C. 154(b) by 192 days.

(21) Appl. No.: 10/297,146

(22) PCT Filed: Jun. 5, 2000

(86) PCT No.: PCT/US00/15480

§ 371 (c)(1),
(2), (4) Date: Aug. 11, 2003

(87) PCT Pub. No.: WO01/95277

PCT Pub. Date: Dec. 13, 2001

(51) Int. Cl.[7] .............................................. G06D 1/00
(52) U.S. Cl. .......................... 702/45; 702/44; 702/50; 702/55
(58) Field of Search ................................ 702/45, 48, 50, 702/56, 127, 177, 178, 44, 55; 340/539.13; 377/118; 700/282; 73/23.34; 137/486, 487.5; 239/68–70

(56) References Cited

U.S. PATENT DOCUMENTS

| 4,015,366 | A | * | 4/1977 | Hall, III ...................... 47/1.43 |
| 5,708,211 | A | * | 1/1998 | Jepson et al. ............ 73/861.04 |
| 6,101,451 | A | | 8/2000 | Smith et al. .................. 702/55 |
| 6,236,953 | B1 | * | 5/2001 | Segal .......................... 702/127 |
| 6,839,644 | B1 | * | 1/2005 | Woods et al. ................ 702/56 |
| 2003/0100998 | A2 | * | 5/2003 | Brunner et al. ............... 702/19 |
| 2004/0128034 | A1 | * | 7/2004 | Lenker et al. .............. 700/282 |

* cited by examiner

Primary Examiner—Marc S. Hoff
Assistant Examiner—Felix Suarez
(74) Attorney, Agent, or Firm—Rutan & Tucker, LLP (57) ABSTRACT

The present invention provides systems and methods that identify a flow anomaly to an operator or other person by: executing a first device of a plurality of water using devices; receiving flow data on a quantity of water used by the first device during a time period required to generate a first water use signature from the first device; comparing a future water use pattern against the first water use signature to identify a flow anomaly with the first device; and providing information regarding the flow anomaly to the person. Identifying anomalies can be useful in numerous ways, including discovering problems that need fixing, reducing waste, and even calculating appropriate irrigation application rates.

21 Claims, 7 Drawing Sheets

METHODS AND APPARATUS FOR USING WATER USE SIGNATURES IN IMPROVING WATER USE EFFICIENCY

FIELD OF THE INVENTION

The field of the invention is water flow meters.

BACKGROUND OF THE INVENTION

In arid areas of the world water is becoming one of the most precious natural resources. Meeting future water needs in these arid areas may require aggressive conservation measures. Each individual living or working in these arid areas should take the initiative to start conserving water. Most individuals are aware of some of the steps they can take to conserve water, such as installing low or ultra low flush toilets, installing water saving shower heads, sweeping rather than hosing off the driveway, checking for leaks in the water system and irrigation system, and irrigating the landscape efficiently. However, with the last two steps, many individuals may not be aware of leaks in their water lines or irrigation systems and/or they are not aware of what measures they can take to irrigate their landscapes more efficiently.

Signature data is data that is specific to a certain individual or thing and is based on a particular characteristic or quality that is specific to that individual or thing. Signature analysis (also known as flow trace analysis) was used by government agencies to obtain information about water use patterns in residences. Flow trace analysis is described in various publications, including DeOreo, W. B., J. P. Heaney, and P. W. Mayer. 1996a. Flow Trace Analysis to Assess Water Use. *Jour. AWWA*, 88 (1):79–90, Dziegielewski, B., E. M. Opitz, J. C. Kiefer, D. D. Baumann, M. Winer, W. Illingworth, W. O. Maddaus, P. Macy, J. J. Boland, T. Chestnutt, and J. O. Nelson. 1993b. Evaluating Urban Water Conservation Programs: *A Procedure's Manual*. Denver, Colo.: AWWA, and Mayer, P. W. and W. B. DeOreo. 1995. Process Approach for Measuring Residential Water Use and Assessing Conservation Effectiveness. *Proc. Of 1995 Annual Conference*. Anaheim, Calif.: AWWA. The government agencies generally gathered this information to assist them to better understand the water use patterns in residences. However, this information was not fed back to individuals nor used for feedback to an irrigation controller and/or was not easily accessible to individuals to assist them in achieving greater efficiency in their water use.

The present invention uses signature data, generated from water using devices that are executed from start to finish, to assist individuals to improve water use efficiency. The signature data for all devices at a given water using site is preferably obtained from only a single water meter, which may advantageously comprise the meter installed by the water district to service the site.

There are methods, other than signature data, used to determine the water used during execution of water using devices. One such method is disclosed in U.S. Pat. No. 5,721,383 issued February 1998 to Franklin, et al. A flow meter is put on each water line that transfers water to the water using device. However, due to the cost, this flow meter system would likely only be used for research purposes since it would not be feasible for homeowners to install flow meters for each of their water using devices.

Water system leaks can result in water waste of as high as 100 gallons per day. Various apparatus have been patented to detect leaks in water lines and irrigation systems. A leak detection device is discussed in U.S. Pat. No. 5,040,409 issued August 1991 to Kiewit. An acoustic sensor and associated electronic circuitry are used to determine when a catastrophic leak occurs in an irrigation system. This apparatus would only detect catastrophic leaks and many leaks are not of a catastrophic nature but still may result in a substantial waste of water over an extended period of time.

Another leak detection device is discussed in U.S. Pat. No. 5,971,011 issued October 1999 to Price. Information is supplied to a microprocessor, which determines a maximum allowable quantity of water that may flow over a specified period of time. If the maximum amount of water is exceeded, during the set period of time, then the flow of water is automatically shut off. The shut off device has to be manually reset to allow the water to flow again. As with the patent, mentioned in the previous paragraph, so also with this patent, it would most likely only shut off the flow of water when a catastrophic leak occurred. Individuals would not want the flow of water shut off unless a leak had likely occurred. Therefore, they would set the water quantity amount high so activation of the automatic shutoff didn't occur when only slightly excessive water was used during the specific set time period.

A better leak detection method would be able to detect small leaks as well as catastrophic leaks, and would feed this information back to individuals so they are aware that there is a leak and provide feedback to an irrigation controller. The present invention meets these requirements.

To irrigate their landscapes more efficiently requires individuals to schedule the watering of their landscapes when the plants need the water. This is being addressed by the manufacture and sale of irrigation controllers that apply water based on potential evapotranspiration (ETo). However, such irrigation controllers are frequently quite expensive and therefore the irrigation users will not replace their present controllers until they have flow anomalies with them. Therefore, to try achieve efficient watering of their landscapes, irrigation users will manually vary the settings on their presently installed irrigation controllers.

To achieve efficient watering, with many of the automatic systems installed today, requires knowledge of the amount of water required to maintain plants in a healthy condition, and the application rate of the irrigation system. Some states are now providing, via radio and other media, the quantity of water required to maintain plants in a healthy condition. To use this information irrigation users must know what the application rate of their irrigation system is. This can be determined by catching the water and determining, from the amount of water caught over a period of time, what the application rate is. The application rate can also be determined by checking at the meter the amount of water flowing through the water meter over a period of time and knowing the area irrigated. However, because of the time and work involved in determining the application rate, by either of the above methods, very few individuals will determine the application rate of their irrigation system.

The present invention will assist individuals to easily determine the application rate, which they can then use, with ETo data, to improve the efficiency in the irrigating of their landscapes.

SUMMARY OF THE INVENTION

The present invention provides systems and methods that identify a flow anomaly to an operator or other person by: executing a first device of a plurality of water using devices; receiving flow data on a quantity of water used by the first device during a time period required to generate a first water use signature from the first device; comparing a future water use pattern against the first water use signature to identify a flow anomaly with the first device; and providing information regarding the flow anomaly to the person. Identifying anomalies can be useful in numerous ways, including discovering problems that need fixing, reducing waste, and even calculating appropriate irrigation application rates.

All water using devices are contemplated, including those employed at residential, commercial, industrial or other types of sites. With respect to households, for example, contemplated devices include internal devices such as showers, toilets, faucets, and home appliances such as washing machines, as well as external devices such as irrigation systems, pools and spas, and so forth. Of course, the various anomalies that can be detected depend in part on the types of water using devices in the system. Leaks and improperly closed valves can be detected for any of the devices, while broken irrigation sprinklers, plugged irrigation sprinkler heads, and so forth are usually specific to irrigation systems. It is especially contemplated that signatures are identified for multiple devices coupled to a common water supply system, with two or more of signatures compared against the same future water use pattern. Such multiple signature comparison can be especially useful where multiple devices may be operating concurrently.

In another aspect of preferred embodiments apparatus to accomplish these tasks is housed in an irrigation controller, which may be advantageously coupled to a flow meter so that flow data is transmitted from the flow meter directly to the irrigation controller. It is especially contemplated that the controller can operate a display that provides real time flow data, and a warning signal generator that provides an alert upon determination of the existence of a flow anomaly. All of the functions are preferably executed by an electronic processor executing software code.

An additional embodiment of the present invention is the providing of real time flow data to an individual so the individual may use the real time flow data to calculate the application rate of an irrigation system. Individuals may then use the application rate, with ETo data, to improve efficiency in the irrigating of their landscapes.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
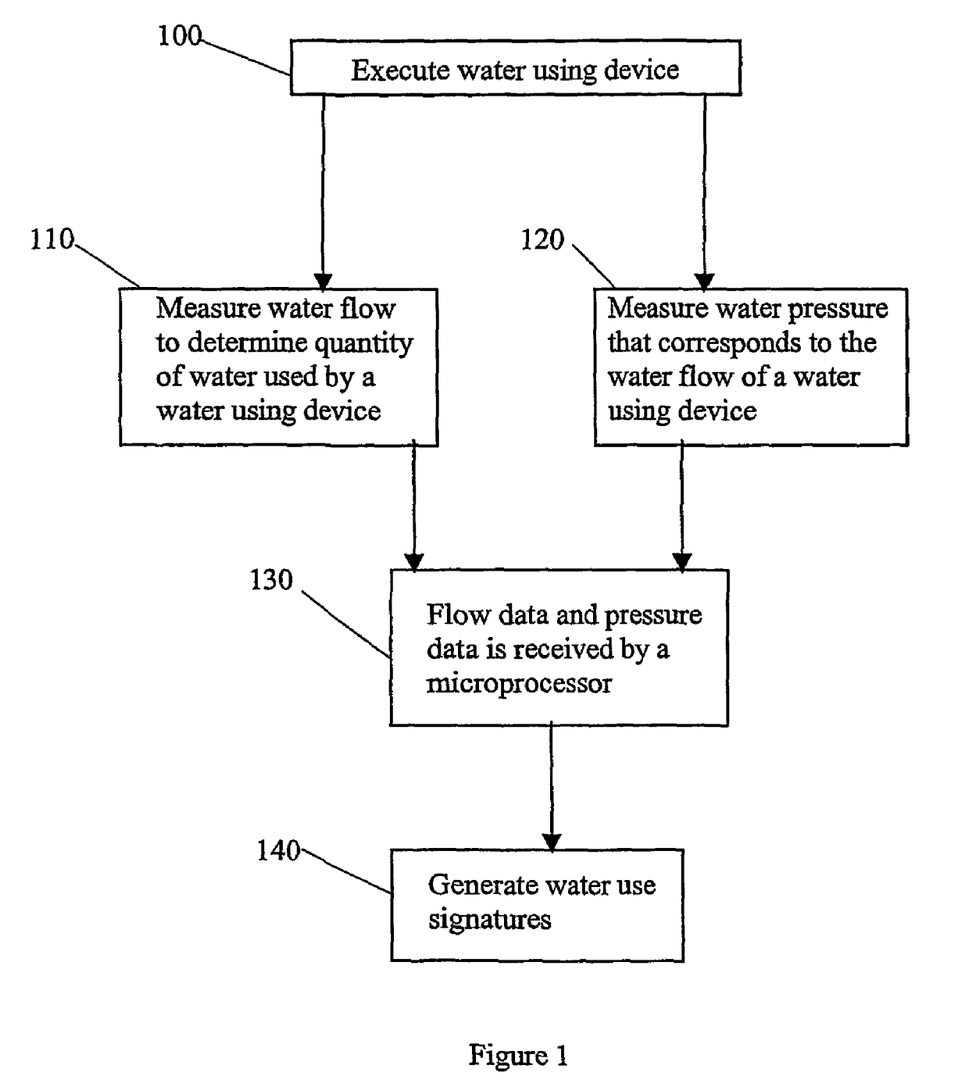
FIG. 1 is a flow chart of steps involved in the determination of a water use signature according to a preferred embodiment.

In FIG. 1 a method for determining a water use signature for a water using devise generally comprises the following steps: executing a water using device 100; measuring water flow used by the device 110; measuring the corresponding water pressure 120, transmitting flow data and pressure data to a microprocessor 130; and the microprocessor generating a water use signature 140. The microprocessor is programmed to store the water use signature, and compare that signature to a future water use pattern to identify a flow anomaly.

In a preferred embodiment water use signature 140 is obtained from a single water meter that was preferably installed during original construction at the site. The single meter is used to monitor water usage of all devices on the system, including, for example, usage inside and outside a residence, business or other water use site. This is best accomplished by running one device at a time, thereby generating successive "clean" signature for each device. Alternatively, it is contemplated to install multiple flow meters, each of which may be coupled to one or more devices.

Figure 2:
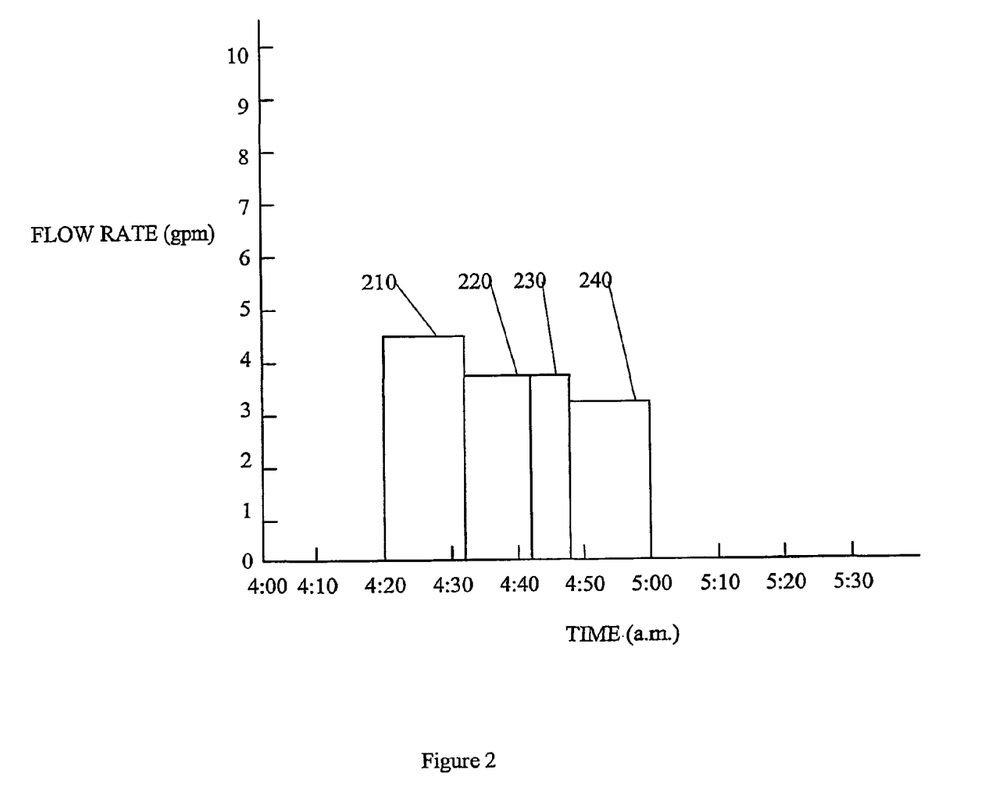
FIG. 2 is a graph of a water use signature derived from operation of an irrigation system.

In FIG. 2 an irrigation system has four stations 210, 220, 230 and 240 controlled by an irrigation controller. In this particular example, the initial start time for the first station of the irrigation system is at 4:20 a.m., with the various stations being set to run for different lengths of time. As indicated by the graph, the quantity of water applied per minute varies for the different stations, and results in different water use signatures. Of course, water use signatures are preferably obtained when the irrigation system is operating without leaks or restrictions in the water lines or spray heads. Those skilled in the art will also appreciate that water pressure can be an important factor in application rate, and therefore water pressure is advantageously measured and incorporated into the various water use signatures.

Figure 3:
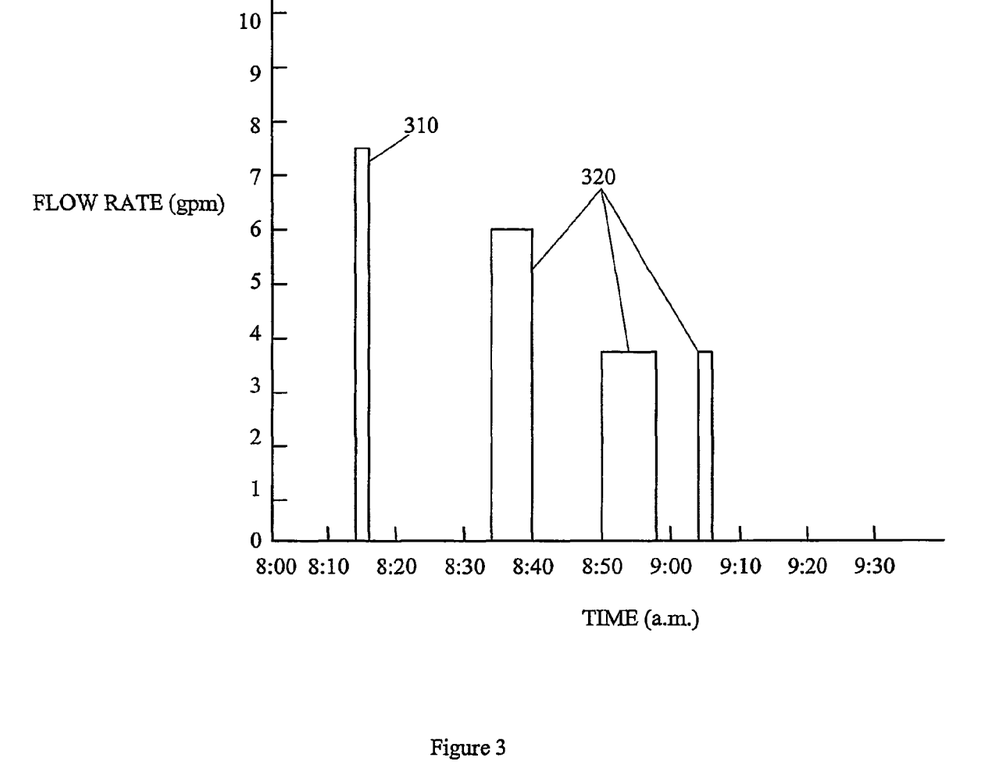
FIG. 3 is a graph of a water use signature derived from flushing of a toilet, and operation of a clothes washer.

FIG. 3 depicts exemplary water use signatures from flushing of a toilet 310 and operation of a clothes washer 320. As mentioned earlier, accurate water use signatures are preferably generated for water using devices when there is no leakage in the system, and no water being used by other devices.

Figure 4:
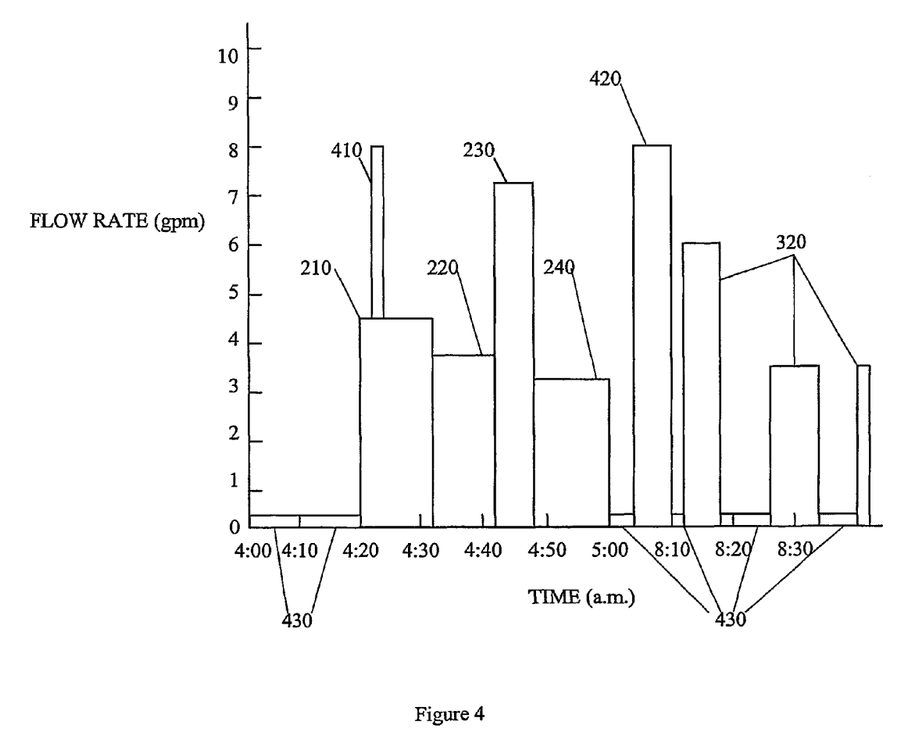
FIG. 4 is a graph of microprocessor generated information provided to an individual to assist in improving water use efficiency.

FIG. 4 is an example of microprocessor generated information that may be provided to an operator or other individual. The term "operator or other individual" is used herein in a very broad sense to include all those persons having an interest in the water usage. This specifically includes home or business owners, and any others who are responsible for paying water usage charges. It also includes water district personnel and other employees and consultants at relevant government or private agencies.

In FIG. 4, the information is displayed in a graphical format, but those skilled in the art will appreciate that the information may alternatively or additionally be displayed in tabular or other formats. With respect to specific signatures, the constancy of water use signature 430 most likely indicates the existence of a slow leak somewhere in the water system. A leaky faucet can result in water waste of 20 to 100 gallons per day. A leaky toilet can result in water waste of 40 plus gallons per day. Signatures 220 and 240 may well correspond to water use by successive stations of an irrigation system, with signature 230 corresponding to water usage by a broken line or broken head of the irrigation system. A broken line or head can easily result in a waste of 5 to 10 gallons of water per minute or more. Signature 420 has a flow rate that corresponds to usage of a toilet, (see e.g., toilet signature 310 in FIG. 3), except that the time frame is too long. In this particular instance, the toilet did not shut off properly. There is an indication of an additional water flow 410 occurring at the same time that station 210 is operating. However, the water flow pattern indicates that the additional water usage was not related to the flow of water through the irrigation system since the start and end time for the water flow pattern 410 was different than for station 210. When compared to signature 310 in FIG. 3, it is evident that the water flow pattern 410, FIG. 4 is due to the flushing of a toilet.

Figure 5:
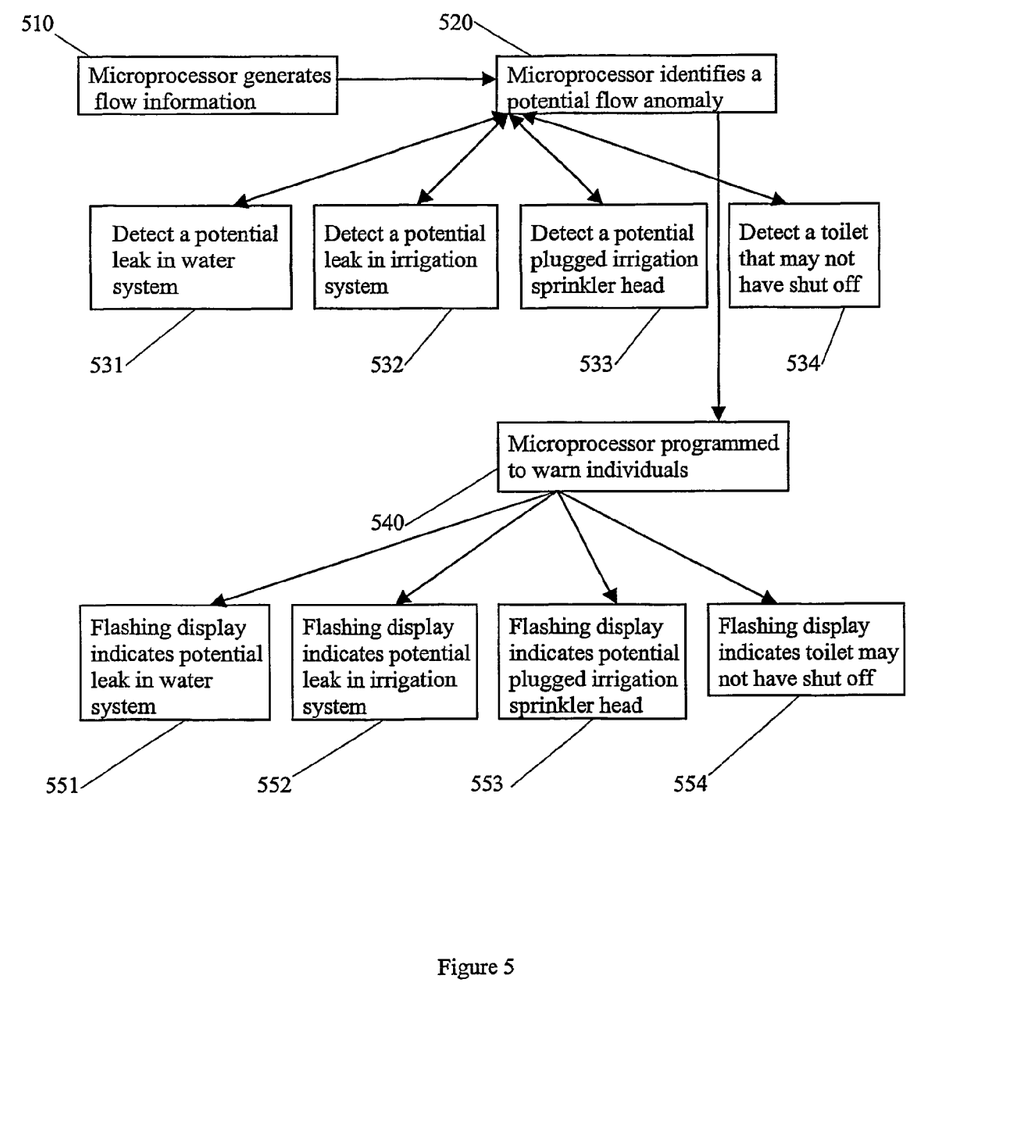
FIG. 5 is a flow chart of steps in generating information, including production of a warning signal.

In FIG. 5, steps in generating information that assist individuals in the detection of water leaks, plugged irrigation sprinkler heads, and other flow anomalies include: the microprocessor generating flow information 510; and identifying a potential flow anomaly 520; which may include one or more of a leak in the water system 531, a leak in the irrigation system 532, a plugged irrigation sprinkler head 533, and a toilet that didn't shut off 534; the microprocessor being programmed to warn one or more individuals 540 when flow anomalies occur 550–554.

The warning may be through any suitable means, including, for example, a flashing display, an alarm mechanism, microprocessor generated information with highlighted water use patterns that do not fit water use signatures that were generated at the water use site, and other warning methods.

Figure 6:
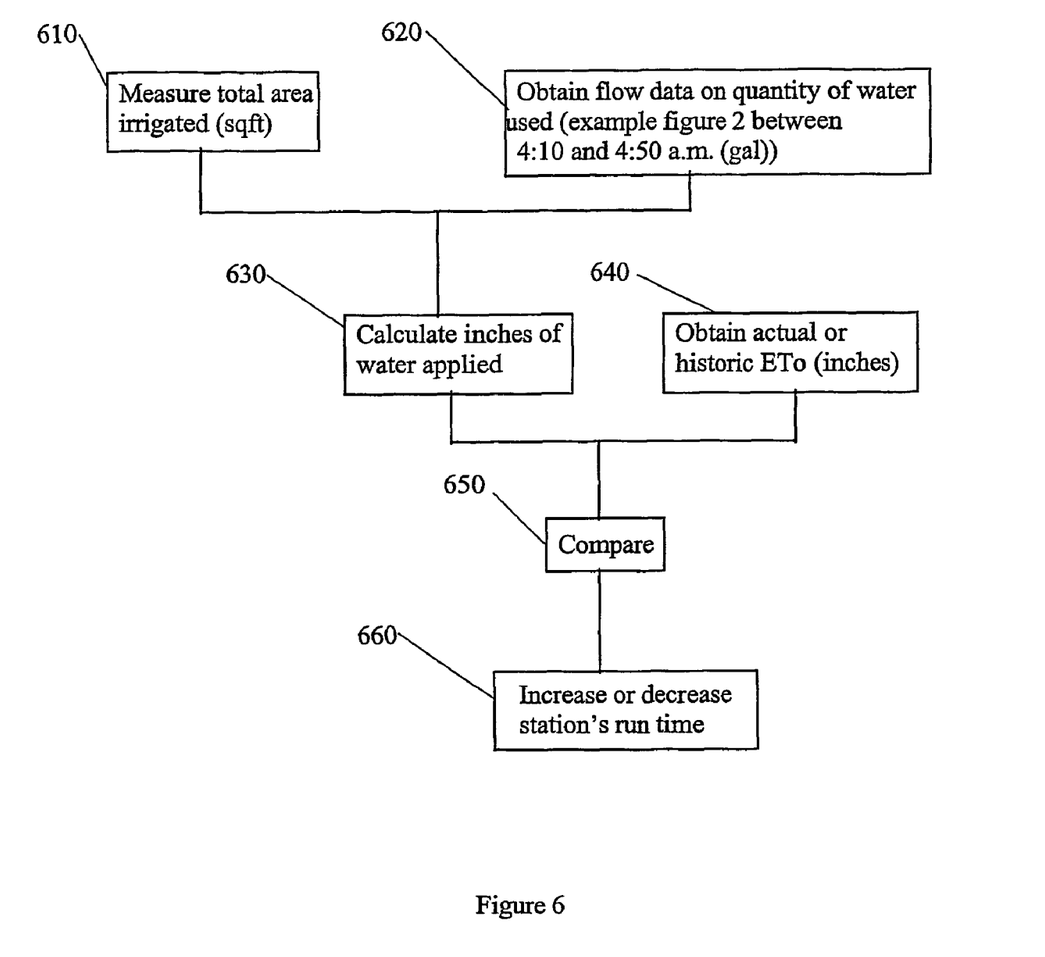
FIG. 6 is a flow chart of steps in generating real time flow data for use in improving efficiency in an irrigation system.

In FIG. 6 a preferred embodiment assists a water user to improve water efficiency in the irrigation of his or her landscape, with steps including measuring the total area that is being irrigated 610; obtaining flow data on the quantity of water used during a typical irrigation period 620; calculating amount (e.g., inches) of water applied to the landscape based on the present irrigation control settings 630; obtaining actual or historic ETo 640; comparing water actually applied against ETo 650; and adjusting (e.g. increasing or decreasing) run time of one or more of the stations 660.

Following is a preferred formula for determining the inches of water being applied by a current setting of an irrigation controller.

$$A/B = 0.6242X$$

A=quantity of water applied during a complete irrigation cycle measured in gallons B=total area irrigated measured in square feet 0.6242 is a constant calibration factor X is the unknown water application rate in inches per a given period of time For example, if the landscaped area irrigated was 5000 square feet and the gallons of water measured by the flow meter during a complete irrigation cycle was 750 gallons then X would equal 0.24 inches of precipitation for the complete irrigation cycle. In this example, 750/5000=0.6242X or 0.15=0.6242X or X=0.15/0.6242, and therefore X=0.24 inches of precipitation for the complete irrigation cycle.

Those skilled in the art will appreciate that the ability to obtain historic or actual ETo data for a given irrigation site depends at least in part on where one lives. California provides daily and/or weekly information on ETo in printed media, over the Internet and sometimes through radio and television broadcast. Some other states do not provide any information on ETo, whereas still others provide information similar to that available in California. It may also be possible to obtain ETo data by referencing other weather factors, such as temperature and solar radiation.

Where individuals can obtain ETo data, they can readily determine the approximate irrigation controller settings to use to provide efficient irrigation of their landscape. For example, during the month of September in Merced, Calif., based on historic data, ETo equals approximately 0.175 inches each day. Therefore, in the example above if an individual had determined that his or her irrigation system was applying 0.24 inches per day, then that individual should reduce the irrigation run times so that 0.175 inches are applied each day.

Figure 7:
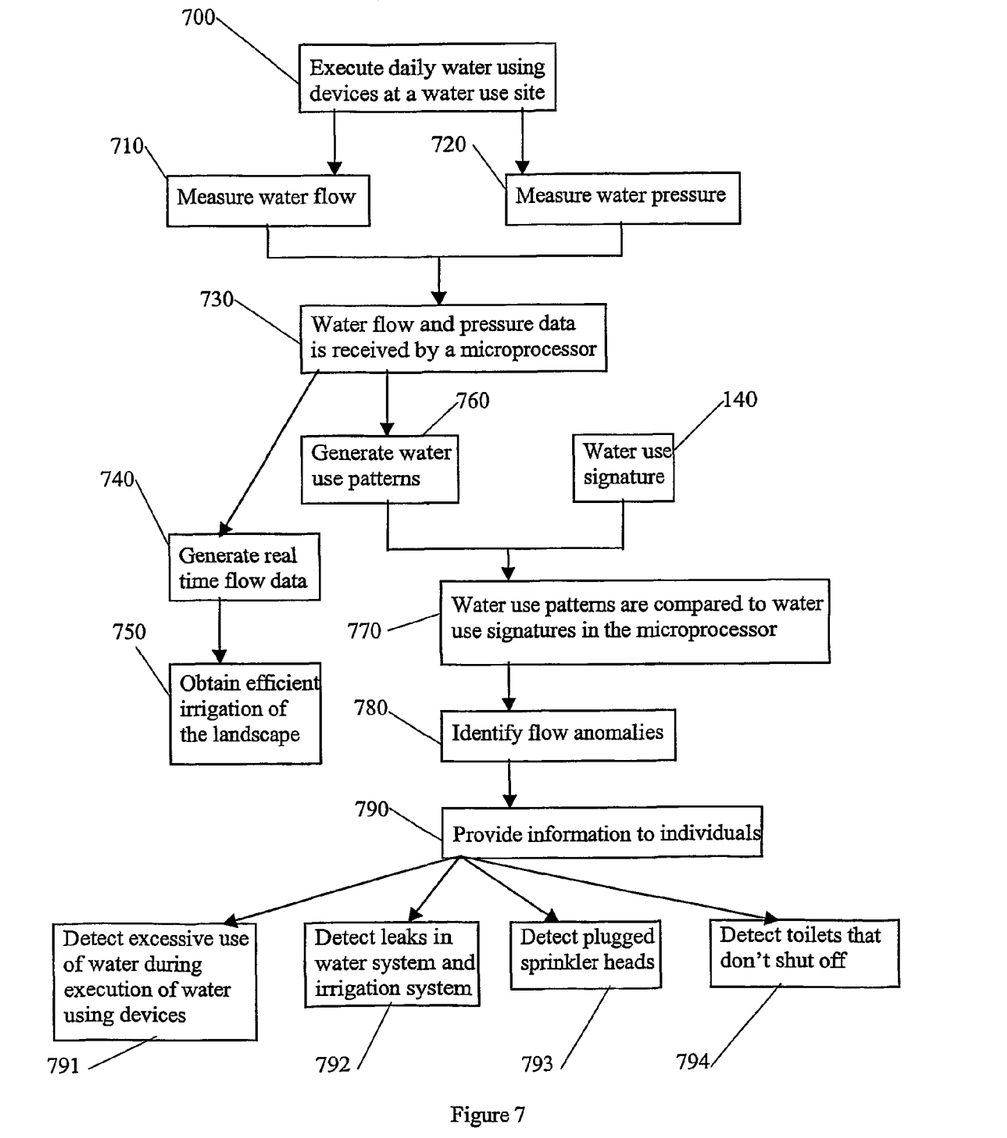
FIG. 7 is a flow chart of steps involved in a preferred embodiment of the present invention.

FIG. 7 is a flow chart of basic steps involved in a preferred embodiment of the present invention. There are daily executions of water using devices at water use sites 700. These water use sites can be residential, commercial, industrial or other water use sites. The water using devices may be any presently known or unknown device. At a residential site, water using devices include home appliances such as dish washers and clothes washers; other indoor water using devices such as toilets, showers and faucets, and outdoor devices such irrigation systems, outdoor faucets that may, for example, be used to wash a car or clean off a driveway. Commercial and industrial sites may use some or all of the same devices as may be present at a residential site, but may alternatively or additionally include water cooled machinery, particulate collectors, and so forth.

Other steps in FIG. 7 include a water meter measuring water flow 710 and water pressure 720 during the execution of the water using devices, and transmitting that information to a microprocessor 730. In a preferred embodiment the microprocessor is an integral part of a computer system, and more preferably of an irrigation control system. If the microprocessor is part of an irrigation controller the microprocessor generated information may advantageously be displayed on the irrigation controller display unit. Alternatively, the microprocessor may be part of a separate unit that has a visual display and/or other means to provide water users or other interested parties with information on flow anomalies. It is especially preferred that the microprocessor receives the water flow and water pressure data directly from the measuring devices. As used herein, the term "directly" means by a direct connection such as through an electric wire. However, the microprocessor may receive the data by other means that does not require a direct connection between the microprocessor and the measuring devices, such as by radio, pager and telephone.

Among contemplated alternative steps, the microprocessor may generate real time water flow data 740, and that data may be used to improve water efficiency in the irrigating of the landscape 750. Improved water efficiency in the irrigation of the landscape may advantageously be accomplished by irrigating plants based on water requirements of plants as indicated by steps 610–660.

The microprocessor may also generate water use patterns from the daily water flow and water pressure data 760. In such circumstances the microprocessor is preferably programmed to store the water use signature 140, and compare the signature against a future water use pattern 770 to identify a flow anomaly with a specific water using device 780, and provide information regarding the flow anomaly to an operator or other individual 790.

It is especially contemplated that the microprocessor generated information may be utilized in helping an operator or other individual to recognize excessive water usage 791. In one study, water consumption was reduced by as much as 20 gallons per day per individual by regular water consumption feedback (William H. Bruvold, Municipal Water Conservation, *California Water Resources Center*, 1988, P. 40).

The microprocessor generated information may also help in identifying possible leaks 792, plugged sprinkler heads 793, and toilets that don't shut off 794. Further, the microprocessor may warn individuals when these or other anomalies are present 540–554.

Thus, specific methods and apparatus for using water use signatures in improving water use efficiency have been disclosed. It should be apparent, however, to those skilled in the art that many more modifications besides those described are contemplated without departing from the inventive concepts herein. The inventive subject matter, therefore, is not to be restricted except in the spirit of the appended claims.

What is claimed is:

1. A method for identifying a flow anomaly in a system having a single flow meter and a plurality of water using devices, comprising:
   executing a first device of the plurality of water using devices;
   receiving flow data on a quantity of water used by the first device during a time period required to generate a first water use signature from the first device;
   comparing a future water use pattern against the first water use signature to identify a flow anomaly with the first device; and
   providing information on the flow anomaly to an individual.

2. The method of claim 1 wherein the first water using device is a home appliance.

3. The method of claim 1 wherein the first water using device is an irrigation system.

4. The method of claim 1 further comprising measuring a water pressure corresponding to the flow data of the first water using device.

5. The method of claim 1 further comprising using a single flow meter to compare the future water use pattern against the first water use signature.

6. The method of claim 1 further comprising:
   executing a second device of the plurality of water using devices;
   receiving flow data on a quantity of water used by the second device during a time period required to generate a second water use signature from the second device;
   comparing the future water use pattern against the second water use signature to identify a flow anomaly with the second device; and
   providing information on the flow anomaly to an individual.

7. The method of claim 6 wherein the second water using device is a home appliance.

8. The method of claim 6 wherein the second water using device is an irrigation system.

9. The method of claim 6 wherein the first water using device is a home appliance and the second water using device is an irrigation system.

10. The method of claim 4 further comprising measuring a water pressure corresponding to the flow data of the second water using device.

11. The method of claim 5 further comprising using the single flow meter to compare the future water use pattern against the second water use signature.

12. A system having an electronic processor that operates code that compares a future water use pattern against a first water use signature and a second water use signature to correlate the future water use pattern with a water use device.

13. The system of claim 12 wherein the electronic processor is housed in an irrigation controller.

14. The system of claim 12 further comprising a communication line that transmits flow data from a flow meter directly to the system.

15. The system of claim 12 wherein the first water use signature corresponds to a leak in the water use device.

16. The system of claim 15 wherein the leak comprises a broken irrigation sprinkler.

17. The system of claim 15 wherein the first water use signature corresponds to a plugged irrigation sprinkler head.

18. The system of claim 12 further comprising a display that displays real time flow data to an individual.

19. The system of claim 12, wherein the code also directs the electronic processor to calculate an irrigation application rate.

20. The system of claim 12, further comprising a warning signal generator that alerts an individual upon determination of an existence of a flow anomaly.

21. A method for identifying a flow anomaly in a system having a single flow meter and a plurality of water using devices, comprising:
   executing a first device of the plurality of water using devices;
   receiving flow data on a quantity of water used by the first device during a time period required to generate a first water use signature from the first device;
   measuring a water pressure corresponding to the flow data;
   comparing a future water use pattern against the first water use signature to identify a flow anomaly with the first device;
   and providing information on the flow anomaly to an individual.

* * * * *